(12) United States Patent
Mysker

(10) Patent No.: US 7,914,364 B2
(45) Date of Patent: Mar. 29, 2011

(54) HYBRID FILLING SYSTEM

(75) Inventor: Thomas Mysker, Twin Lakes, WI (US)

(73) Assignee: Precitec Corporation, Mundelein, IL (US)

( * ) Notice: Subject to any disclaimer, the term of this patent is extended or adjusted under 35 U.S.C. 154(b) by 0 days.

(21) Appl. No.: 12/541,430

(22) Filed: Aug. 14, 2009

(65) Prior Publication Data

US 2011/0039486 A1    Feb. 17, 2011

(51) Int. Cl.
*A22C 11/00* (2006.01)
(52) U.S. Cl. .......................................................... 452/32
(58) Field of Classification Search .............. 452/21–27, 452/30–37, 46–48, 51
See application file for complete search history.

(56) References Cited

U.S. PATENT DOCUMENTS

| RE32,315 | E * | 12/1986 | Kollross | 452/22 |
| 4,893,377 | A * | 1/1990 | Evans et al. | 452/34 |
| 4,914,784 | A * | 4/1990 | Nausedas | 452/34 |
| 6,932,688 | B2 * | 8/2005 | Stanley et al. | 452/48 |
| 7,306,511 | B2 * | 12/2007 | Whittlesey et al. | 452/45 |
| 7,322,163 | B2 * | 1/2008 | Griggs et al. | 53/138.4 |
| 7,392,642 | B2 * | 7/2008 | Topfer | 53/567 |
| 7,442,117 | B2 * | 10/2008 | Kruse | 452/31 |
| 7,467,993 | B2 * | 12/2008 | Whittlesey et al. | 452/37 |
| 7,544,118 | B2 * | 6/2009 | Mysker et al. | 452/32 |

* cited by examiner

*Primary Examiner* — Thomas Price
(74) *Attorney, Agent, or Firm* — Clark Hill PLC

(57) ABSTRACT

A system for encasing food products in film is described. The system comprises a mixer, a sealer in fluid communication with the mixer, a swivel mounted to a downstream side of the sealer, a stuffing horn mounted to a downstream side of the swivel, and a clipper. The stuffing horn is movable from a first position adjacent to said clipper, to a second position remote from said clipper.

9 Claims, 4 Drawing Sheets

US 7,914,364 B2

HYBRID FILLING SYSTEM

BACKGROUND OF THE INVENTION

This invention relates to generally to the field of preparing food products in tubular casings. The invention relates more specifically to the field of preparing sausages and whole-muscle meats. The invention will be described as used for the production of sausages, but it applies equally to the production of whole-muscle meats, cheeses, vegetarian food products, and any other material that is wrapped in a casing.

Sausages are conventionally produced by extruding a pasty mixture of meat products, spices, and fillers into a tubular casing. (Some sausages are then wrapped in netting prior to processing.) The casing comes in several forms. Edible collagen films, for example, including flavored and colored films, remain on the sausage after processing. Inedible films are used solely for packing the sausage and are removed prior to use.

There are two types of casings conventionally used: tubular casings and flat sheets. Tubular casings are shirred onto a horn that is then placed over the discharge of the sausage stuffer/clipper. Illustrative processes and devices for making sausage from tubular casings are described in, for example, U.S. Pat. No. 5,024,041 to Urban, Process for Filling Tubular Casings and in U.S. Pat. No. 7,063,610 to Mysker, Apparatus and Method to Net Food Products in Shirred Tubular Casing, the disclosures of which are both incorporated herein by reference. This method has the advantage of not having a seam in the casing. However, the casing must first be shirred over a horn before use, which adds a step in the manufacturing process. Additionally, once the shirred casing on the horn runs out, the sausage-making process must be stopped to remove the empty horn and to either re-shir the horn with fresh casing or to attach a spare horn on which casing has already been shirred.

In another method, flat sheets of film, such as collagen film, are turned over plows by an automatic heat-sealing machine to produce a tubular casing. A representative process is shown in, for example, U.S. Pat. No. 4,985,477 to Winkler, Apparatus for Production of Meat Products. The use of flat sheets eliminates the need to shir the casing onto a horn prior to use and allows for extended use. But some films cannot be heat sealed and accordingly are not well-adapted to this method. Additionally, this method leaves a seam in the casing, which can be undesirable.

A sausage maker using one of these methods may need to switch to the other method because of production needs caused by customer demands. Switching a sausage-making line from one method to the other causes an interruption in the manufacturing process. A conventional sausage stuffer/clipper can operate continuously for a long period of time. But every time the sausage maker wants to switch from one type of casing to the other, the manufacturing process must be stopped to change the equipment. A solution to this problem was addressed in U.S. Pat. No. 7,306,511 to Whittlesey et al., Systems with Interchangeable Horns for Producing Encased Products and Related Methods, Computer Program Products and Horn Rotor Assemblies. Another solution was proposed in U.S. Pat. No. 7,544,118 to Mysker et al., Hybrid Filling System. The present invention improves on these solutions by simplifying the horn arrangement and thereby minimizing the downtime caused by switching from one type of casing to another.

BRIEF SUMMARY OF THE INVENTION

Briefly, and in accordance with the foregoing, the system of the preferred embodiment of the present invention comprises a system for a mixer, a sealer in fluid communication with the mixer, a swivel mounted to a downstream side of the sealer, a stuffing horn mounted to a downstream side of the swivel, and a clipper. The stuffing horn is movable from a first position adjacent to said clipper, to a second position remote from said clipper.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS OF THE INVENTION

Figure 1:
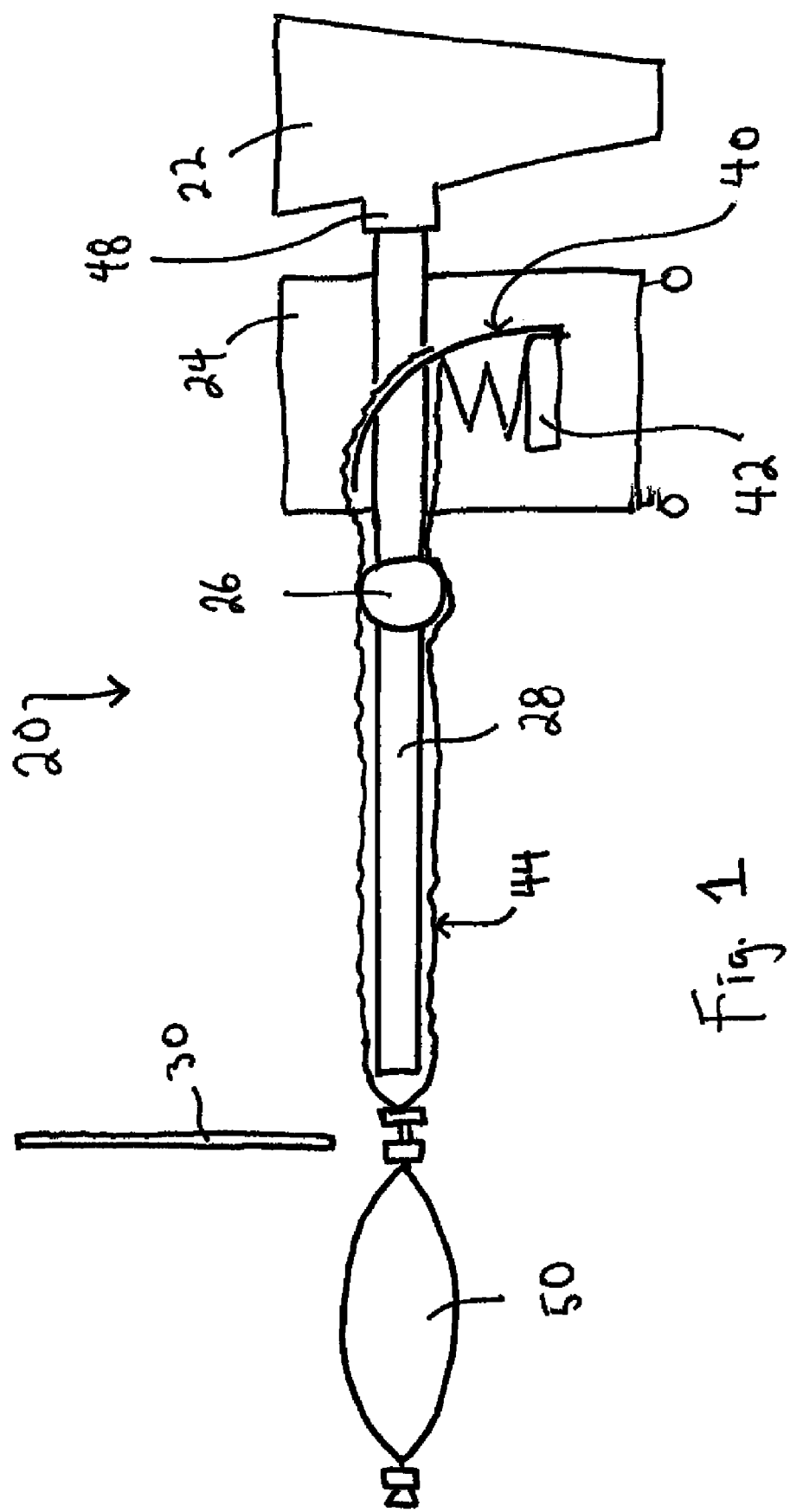
FIG. 1 is an elevation diagrammatic view of the system of the preferred embodiment of the present invention, using flat film stock.
Figure 2:
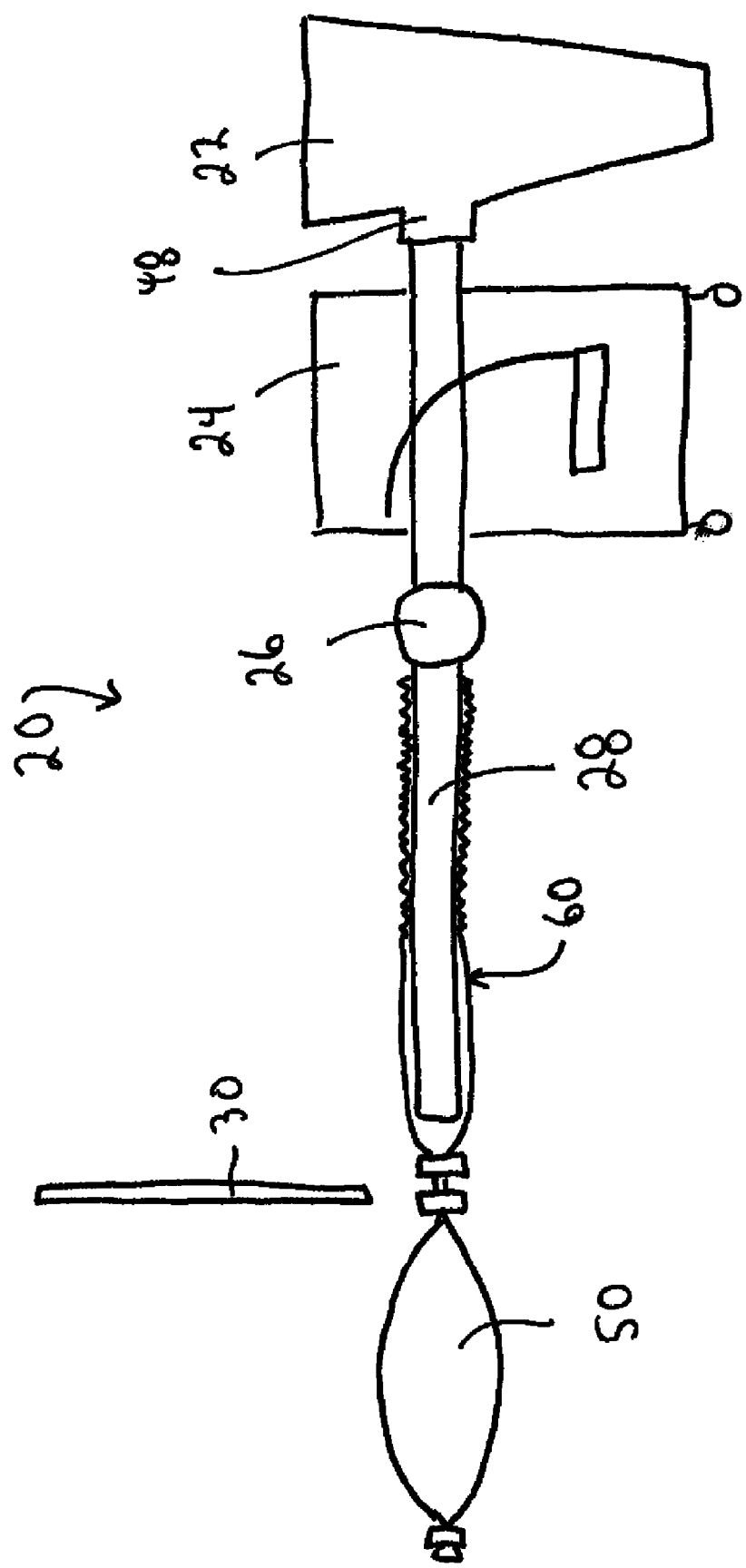
FIG. 2 is an elevation diagrammatic view of the system of FIG. 1, using tubular casing.

While the invention may be susceptible to embodiment in different forms, there is shown in the drawings and described herein a specific embodiment with the understanding that the present disclosure is to be considered an exemplification of the principles of the invention and is not intended to limit the invention to what is illustrated and described.

The system 20 of the present invention, as shown in FIGS. 1 through 4, comprises a mixer 22, sealer 24, an automatic heat-sealing machine, on which is mounted a swivel 26, a stuffing horn 28 attachable to the downstream side of swivel 26, and a clipper 30 located at the downstream end of stuffing horn 28. Mixer 22 is a conventional food-mixing apparatus, such as a sausage mixer, and inherently contains a pump. Sealer 24 is preferably a Poly-clip System TSA 200 Automated Sealing Machine. Clipper 30 is preferably a Poly-clip System ICA 8700 Automatic Double Clipper.

Figure 3:
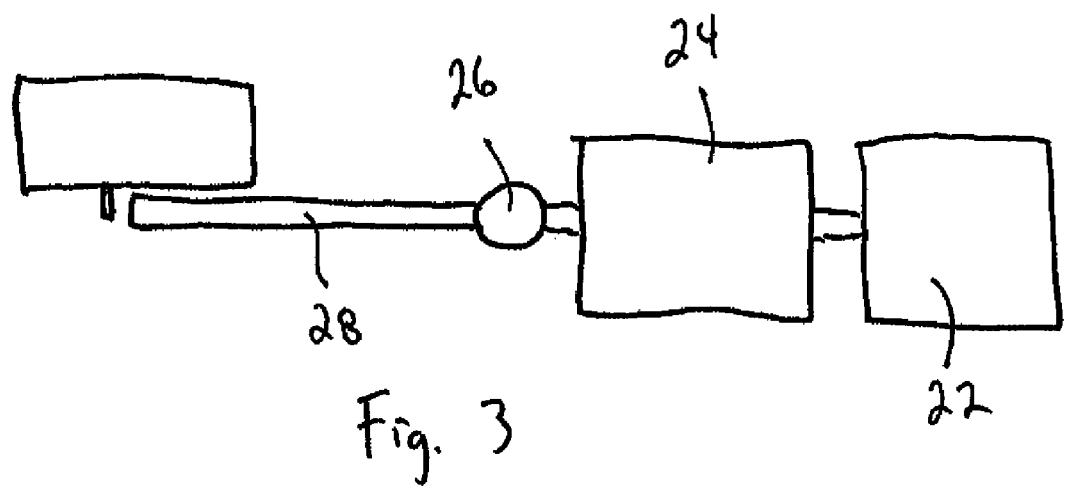
FIG. 3 is a plan view of the system of FIG. 1, with the stuffing horn in a first position.
Figure 4:
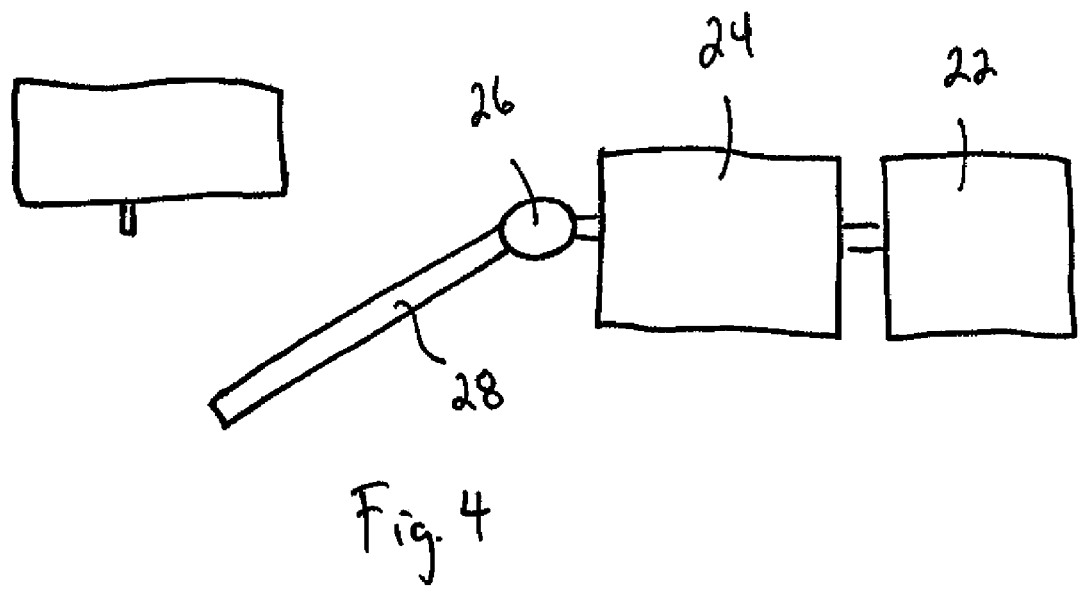
FIG. 4 is a plan view of the system of FIG. 1, with the stuffing horn in a second position.

Swivel 26 is a rotary coupling that allows stuffing horn 28 to swing in an arc, preferably of at least 45 degrees. As shown in overhead view in FIGS. 3 and 4, stuffing horn 28 moves from a first position, adjacent clipper 30, as shown in FIG. 3, to a second position, remote from clipper 30, as shown in FIG. 4.

Please note that the food-containing components of system 20 are preferably made of stainless steel for ease of cleaning.

Sealer 24 contains a plow 40. A flat sheet of film 42, such as an edible collagen film, which is produced in fan-fold arrangement, is mounted on and turned over plow 40 to create a tube. Sealer 24 seals the seam of the tube to form rolled stock casing 44. Casing 44 proceeds out of sealer 24, over swivel 26, and over stuffing horn 28.

Mixer 22 combines meat products, spices, and fillers to create a pasty mixture. Mixer 22 is in fluid communication with sealer 24. The mixture is pumped or extruded through a stationary horn 48 into sealer 24 and then through swivel 24 and into stuffing horn 28. As the mixture exits the downstream end of stuffing horn 28, it fills rolled stock casing 44 in a conventional manner. As the mixture expands and fills rolled stock casing 44, a sausage 50 is formed, as shown in FIG. 1. Clipper 30 grasps the filled rolled stock casing 44, separates a short section to form a neck, applies two clips the neck, and severs rolled stock casing 44 between the clips. The downstream clip thus forms the back end of a completed sausage 50 and the upstream clip forms the front end of what will become the next sausage 50. (Alternatively, the neck is not severed and a string of sausages 50 can be formed. Some users prefer to apply a single clip when forming a string of sausages 50.)

When the user wishes to switch to a different type of casing, mixer 22 is shut down. Stuffing horn 28 is swung through an arc to the second position shown in FIG. 4. The rolled stock casing 44 is cut and removed from stuffing horn 28 and a length of tubular casing 60 is shirred onto stuffing horn 28. Stuffing horn is swung back to its first position shown in FIG. 3 and mixer 22 is re-started. The process continues to make sausages 50, from tubular casing 60. In this application, flat film stock 42 is detached from plow 40 and the power to sealer 24 can be turned off. The pasty mixture simply proceeds through sealer 24.

In another embodiment, a spare stuffing horn 28 is used. Tubular casing 60 is shirred onto spare stuffing horn 28. When mixer 22 is shut down and stuffing horn 28 is swung to the position shown in FIG. 4, casing 44 is severed, stuffing horn 28 is detached from swivel 26, and spare stuffing horn 28 is attached to swivel 26. Stuffing horn 28 is swung back to its first position and the mixer is re-started to make sausages.

Figure 5:
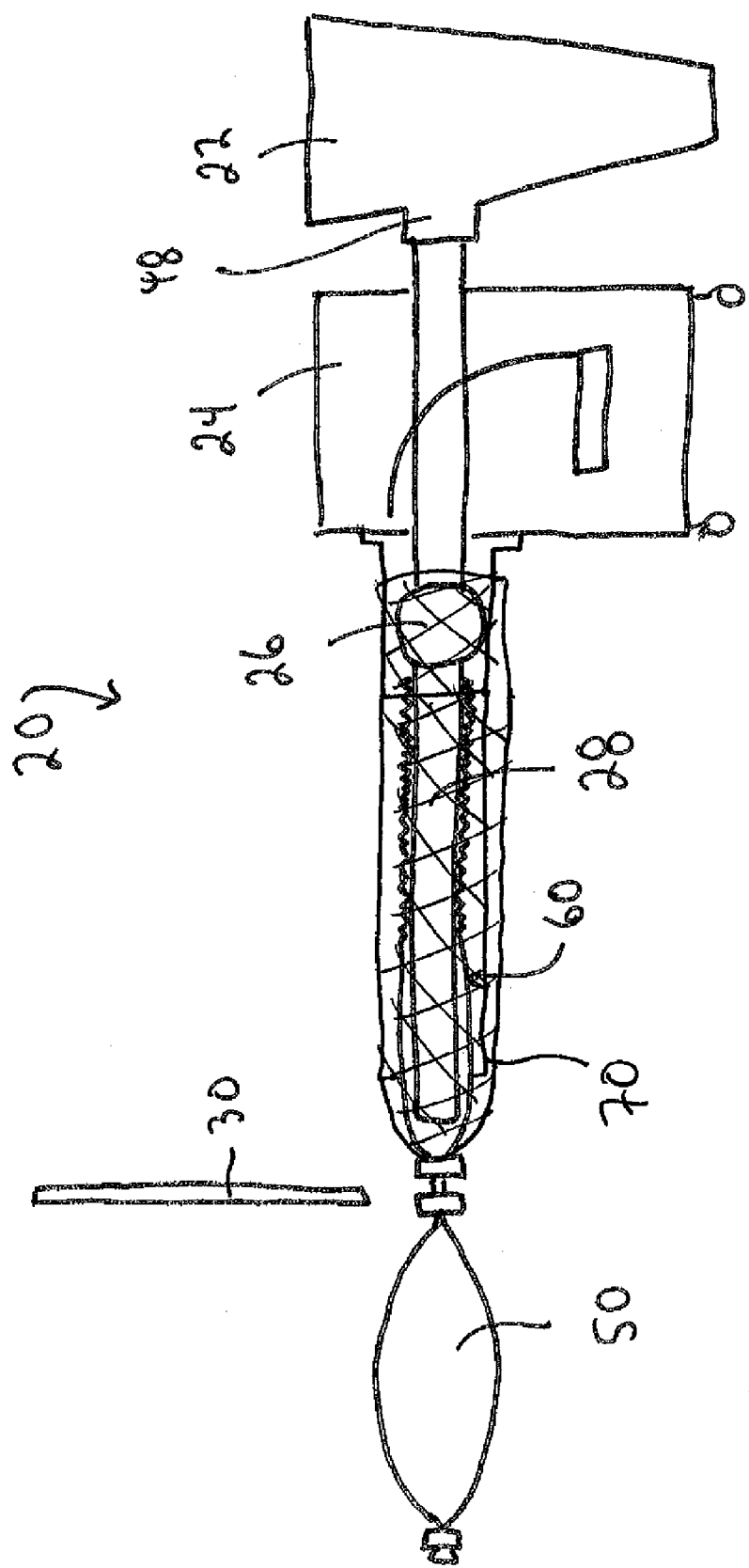
FIG. 5 is a diagrammatic view of the system of FIG. 2 with a netting tube.

In another embodiment, a netting horn 70 is placed over stuffing horn 28 and mounted to sealer 24, as shown in FIG. 5. Netting horn 70 can be used with either the flat film application shown in FIG. 1 or the tubular casing application shown in FIG. 2. In this manner, netted sausages 50 can be made, using the process described in, for example, the '610 patent to Mysker.

The novel combination of elements of the preferred embodiments as described above produce synergistic effects. Prior attempts to run a hybrid system, capable of making sausage from flat film or from tubular casing, required two product horns, whereas the present invention requires but a single stuffing horn. This simplification lowers capital costs, maintenance costs, and operating costs. Downtime to change over from one type of film to another is reduced as well. Additionally, no extra storage space is required to store the unused sealer when tubular casing is being used.

While preferred embodiments of the present invention are shown and described, it is envisioned that those skilled in the art may devise modifications of the present invention without departing from the spirit and scope of the appended claims.

The invention claimed is:

1. A system for encasing products in film, said system comprising:
   a sealer;
   a swivel mounted to a downstream side of said sealer, said swivel comprising a rotary coupling;
   a stuffing horn mounted to a downstream side of said swivel; and
   a clipper;
   aid stuffing horn movable from a first position adjacent to said clipper, to a second position remote from said clipper.

2. The system of claim 1, further comprising a spare stuffing horn.

3. The system of claim 1, further comprising flat film stock in said sealer.

4. The system of claim 1, further comprising tubular casing shirred onto said stuffing horn.

5. The system of claim 1, further comprising a netting tube mounted over said stuffing horn.

6. A system for encasing products in film, said system comprising:
   a sealer;
   a mixer upstream of said sealer and in fluid communication with said sealer;
   a swivel mounted to a downstream side of said sealer, said swivel comprising a rotary coupling;
   a stuffing horn mounted to a downstream side of said swivel; and
   a clipper;
   said stuffing horn movable from a first position adjacent to said clipper, to a second position remote from said clipper.

7. The system of claim 6, further comprising flat film stock in said sealer.

8. The system of claim 6, further comprising tubular casing shirred onto said stuffing horn.

9. The system of claim 6, further comprising a netting tube mounted over said stuffing horn.

* * * * *